United States Patent
Kursar

(10) Patent No.: US 11,294,949 B2
(45) Date of Patent: Apr. 5, 2022

(54) SYSTEMS AND METHODS FOR QUERYING A DISTRIBUTED INVENTORY OF VISUAL DATA

(71) Applicant: Toyota Connected North America, Inc., Plano, TX (US)

(72) Inventor: Brian M. Kursar, Fairview, TX (US)

(73) Assignee: Toyota Connected North America, Inc., Plano, TX (US)

(*) Notice: Subject to any disclaimer, the term of this patent is extended or adjusted under 35 U.S.C. 154(b) by 490 days.

(21) Appl. No.: 16/120,810

(22) Filed: Sep. 4, 2018

(65) Prior Publication Data

US 2020/0073969 A1 Mar. 5, 2020

(51) Int. Cl.
*G06F 16/532* (2019.01)
*G06F 16/71* (2019.01)
*G06F 16/783* (2019.01)
*G06N 20/00* (2019.01)
*G06F 16/78* (2019.01)
*G06F 16/9537* (2019.01)

(52) U.S. Cl.
CPC ............ *G06F 16/532* (2019.01); *G06F 16/71* (2019.01); *G06F 16/7837* (2019.01); *G06F 16/7867* (2019.01); *G06F 16/9537* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 7,956,890 B2 | 6/2011 | Cheng et al. |
| 8,550,909 B2 | 10/2013 | Gerson et al. |
| 9,152,870 B2 | 10/2015 | Sawhney et al. |
| 9,740,951 B2 | 8/2017 | Vrabete |
| 9,792,562 B1 | 10/2017 | Chen et al. |

(Continued)

FOREIGN PATENT DOCUMENTS

WO 2018031562 A1 2/2018

OTHER PUBLICATIONS

Zhang, et al, "Open VDAP: An Open Vehicular Data Analytics Platform for CAVs", 2018 IEEE 38th International Conference on Distributed Computing Systems (11 pages).

*Primary Examiner* — Amresh Singh
(74) *Attorney, Agent, or Firm* — Christopher G. Darrow; Darrow Mustafa PC

(57) ABSTRACT

System, methods, and other embodiments described herein relate to using vehicles as mobile observation platforms and improving the querying of visual data within the vehicles by leveraging edge computing resources of the vehicles in a distributed network. In one embodiment, a method includes, in response to receiving, in a selected vehicle that is equipped with at least one camera, a visual query from a remote device, identifying search parameters from the query that specify at least visual content that is to be identified. The method includes analyzing a subset of a visual inventory to identify whether the subset includes the visual content by using at least a machine vision model executing on a processor within the selected vehicle. The visual inventory includes camera data that is acquired by the selected vehicle. The method includes communicating detection results about whether the subset includes the visual content to the remote device.

19 Claims, 9 Drawing Sheets

(56) References Cited

U.S. PATENT DOCUMENTS

| | | |
|---|---|---|
| 10,460,183 B2 * | 10/2019 | Welland ............... G06K 9/6293 |
| 2012/0028599 A1 | 2/2012 | Hatton et al. |
| 2012/0039506 A1 | 2/2012 | Sturzel et al. |
| 2013/0201330 A1 | 8/2013 | Thornton et al. |
| 2014/0036076 A1 * | 2/2014 | Nerayoff ............ G06K 9/00791 |
| | | 348/148 |
| 2014/0328512 A1 | 11/2014 | Gurwicz et al. |
| 2016/0098925 A1 | 4/2016 | Bhogal et al. |
| 2016/0357262 A1 | 12/2016 | Ansari |
| 2017/0078626 A1 | 3/2017 | Chowdhery et al. |
| 2017/0351940 A1 | 12/2017 | Mazzarella et al. |
| 2018/0005042 A1 | 1/2018 | Loce et al. |
| 2018/0018508 A1 | 1/2018 | Tusch |
| 2019/0065867 A1 * | 2/2019 | Huang ............... G06K 9/00805 |

* cited by examiner

SYSTEMS AND METHODS FOR QUERYING A DISTRIBUTED INVENTORY OF VISUAL DATA

TECHNICAL FIELD

The subject matter described herein relates, in general, to a system and method for querying a distributed network of visual data sources, and, more particularly, to selectively querying groups of visual data sources by leveraging edge computing resources of the sources to execute the querying.

BACKGROUND

Video surveillance systems are generally used to provide security for a single location through the use of costly infrastructure-based video cameras, recording devices, monitoring systems, and so on. Such systems generally record video provided over wired connections into a command center. Upon the occurrence of an event of interest (e.g., an accident, a robbery, etc.), a system administrator may gather the recorded video for authorities to review manually or review the footage directly. In either approach, a person is manually reviewing what may amount to hundreds of hours of footage when accounting for collected video from a multitude of different cameras. Additionally, collecting video from other sources such as infrastructure cameras, businesses, and so on is not only complex logistically in relation to interacting with and acquiring the data but also adds further video to review that may have little to no value in relation to the query. Furthermore, reviewing the data in this manner also does not translate well to circumstances that are time-sensitive. For example, if a pursuit or manhunt is underway, then manually acquiring and reviewing video data is generally not feasible for purposes of tracking a target.

Moreover, further consider that vehicles may be equipped with sensors that facilitate perceiving other vehicles, obstacles, pedestrians, and additional aspects of a surrounding environment. For example, an autonomous vehicle generally uses electronic sensors such as cameras, LiDAR, and other sensors to acquire information about a surrounding environment. The information can take different forms such as still images, video, point clouds, and so on. However, while the vehicle collects a wide array of information for purposes related to the functioning of the vehicle, this information is generally not available for secondary purposes such as surveillance. Moreover, communicating image/video data over a wireless data link can represent a significant cost. By way of example, a single hour of high-definition video can cost hundreds of dollars at current market rates to communicate over a cellular connection. As such, current mechanisms for video surveillance are generally inflexible in relation to limited locations surveilled and real-time derivation of information, while costs associated with communicating video data from mobile platforms such as vehicles are generally prohibitive.

SUMMARY

In one embodiment, example systems and methods relate to a manner of selectively querying an inventory of visual data that is geographically distributed among different collection devices such as vehicles. As noted, infrastructure-based surveillance systems (e.g., static mounted cameras) can suffer from difficulties associated with cost (e.g., expensive statically mounted cameras), collecting and reviewing data from disparate sources, and so on. Moreover, leveraging video data from mobile sources such as vehicles equipped with cameras also generally suffers from difficulties with costs, such as costs related to offloading video using wireless connectivity.

Accordingly, in one embodiment, the disclosed approach exploits edge computing resources of vehicles to locally process visual data at the point of collection so that the vehicles can generate determinations about the presence of events, objects, and so on embodied in the visual data without incurring costs associated with offloading the bulk visual data from the vehicles and while also avoiding difficulties of collecting and reviewing the visual data manually. Thus, in one embodiment, a query system initially generates a visual query for a particular object (e.g., person). The query system searches an available visual inventory (e.g., available camera data distributed among vehicles) by selecting vehicles to query through knowledge about the current and past locations of the vehicles and also according to, for example, areas of interest that may be associated with the event. Thus, the query system communicates the visual query to a sample of the available vehicles in order to query the visual inventory.

The vehicles that receive the visual query analyze, for example, either stored visual data acquired when traveling through an area of interest at a particular time or real-time visual data presently being acquired from one or more cameras. The vehicles use a machine vision model included within the visual query that embodies aspects relating to the event. Consequently, the vehicles can selectively process relevant segments of the visual data using the machine vision model to determine whether the relevant aspects are present. Consequently, the vehicles can provide simple affirmative messages upon positive identification in place of a bulk data transfer of actual video, which may or may not include the desired subject. Accordingly, the vision system avoids excessive use of communications bandwidth while also distributing the querying task to computing resources within the vehicle. In this way, the query system and the vision systems within the distributed vehicles function together to improve the efficiency of processing visual data while also leveraging a wide network of available devices in place of static surveillance infrastructure. The resulting distributed querying of the visual inventory provides a more robust approach that leverages the ubiquitous nature of vehicles within public spaces.

In one embodiment, a vision system for improving the querying of visual data by using edge computing resources of collection devices in a distributed network is disclosed. The vision system includes one or more processors and a memory communicably coupled to the one or more processors. The memory stores an acquisition module including instructions that when executed by the one or more processors cause the one or more processors to, in response to receiving, from a remote device, a visual query in a selected vehicle that is equipped with at least one camera, identify search parameters from the query that specify at least visual content that is to be identified. The memory stores a search module including instructions that when executed by the one or more processors cause the one or more processors to analyze a subset of a visual inventory to identify whether the subset includes the visual content by using at least a machine vision model executing on a processor within the selected vehicle. The visual inventory includes camera data that is acquired by the selected vehicle from the at least one camera. The search module further includes instructions to communicate detection results about whether the subset includes the visual content to the remote device.

In one embodiment, a non-transitory computer-readable medium for improving the querying of visual data by using edge computing resources of collection devices in a distributed network and including instructions that when executed by one or more processors cause the one or more processors to perform one or more functions. The instructions include instructions to, in response to receiving, from a remote device, a visual query in a selected vehicle that is equipped with at least one camera, identify search parameters from the query that specify at least visual content that is to be identified. The instructions further include instructions to analyze a subset of a visual inventory to identify whether the subset includes the visual content by using at least a machine vision model executing on a processor within the selected vehicle. The visual inventory includes camera data that is acquired by the selected vehicle from the at least one camera. The instructions include instructions to communicate detection results about whether the subset includes the visual content to the remote device.

In one embodiment, a method for improving the querying of visual data by using edge computing resources of collection devices in a distributed network is disclosed. In one embodiment, a method includes, in response to receiving, in a selected vehicle that is equipped with at least one camera, a visual query from a remote device, identifying search parameters from the query that specify at least visual content that is to be identified. The method includes analyzing a subset of a visual inventory to identify whether the subset includes the visual content by using at least a machine vision model executing on a processor within the selected vehicle. The visual inventory includes camera data that is acquired by the selected vehicle from the at least one camera. The method includes communicating detection results about whether the subset includes the visual content to the remote device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
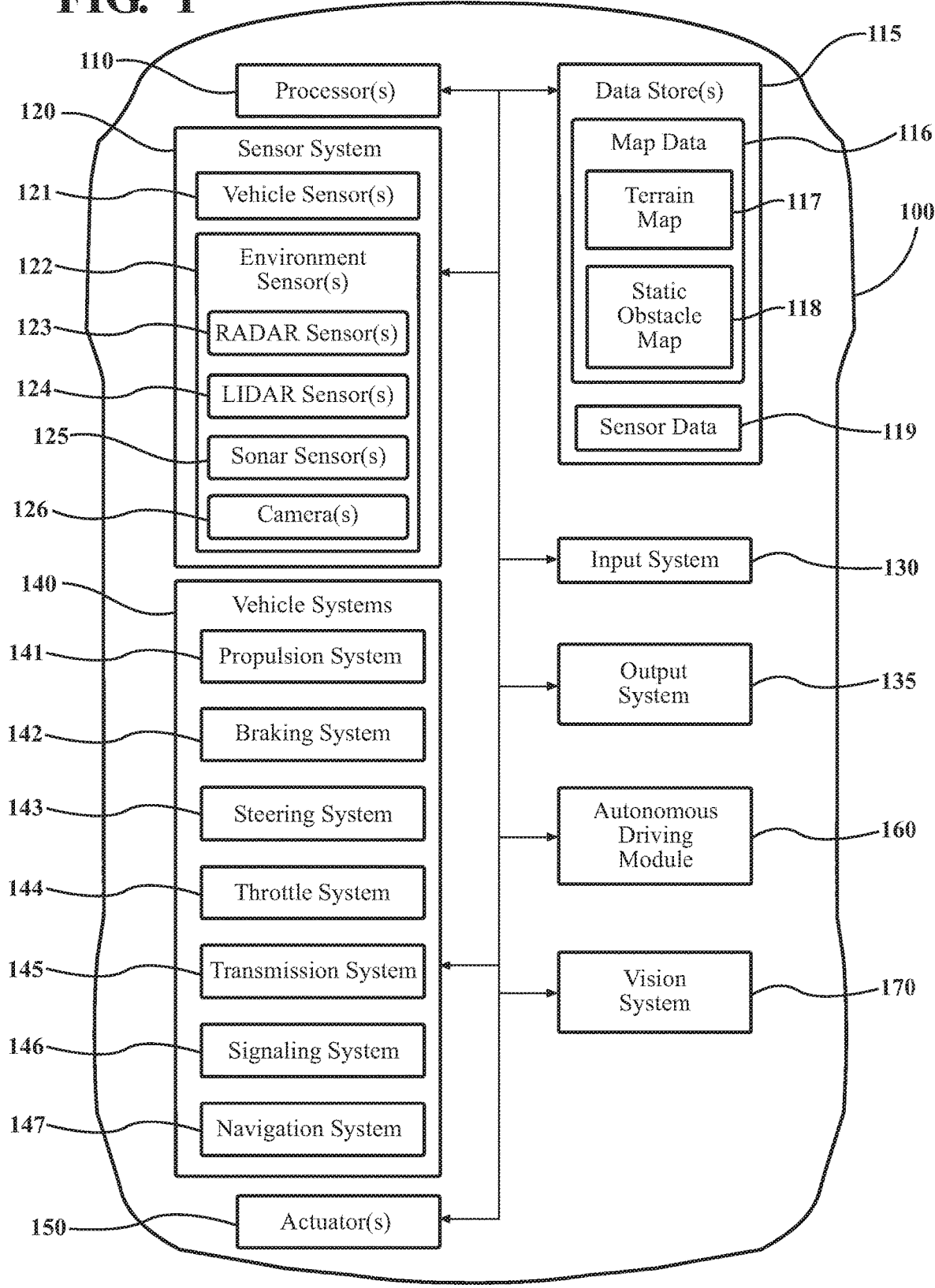
FIG. 1 illustrates one embodiment of a vehicle within which systems and methods disclosed herein may be implemented.

Systems, methods, and other embodiments associated with a manner of querying a distributed inventory of visual data are disclosed. As noted, using statically configured cameras to monitor for security events, and other purposes can suffer from various difficulties such as delays due to collecting video from disparate sources, reviewing the video, and overall costs (e.g., expensive statically mounted cameras, personnel to review video, etc.). Moreover, mobile sources of visual data such as vehicles equipped with cameras also suffer from difficulties, such as limited bandwidth for communicating video, costs related to offloading video using wireless connectivity, and so on.

Accordingly, in one embodiment, the disclosed approach exploits edge computing resources of vehicles while also exploiting the pervasive nature of vehicles throughout public areas to improve on the ability to monitor for and report about objects/events of interest (e.g., Amber Alerts, natural disasters, wanted persons/vehicles, traffic accidents, community blight, road conditions, etc.). For example, vehicles are a primary form of transit in many places and are thus omnipresent throughout public areas such as shopping venues, schools, public roadways, and in other areas. Thus, when equipped with cameras, these same vehicles represent a valuable source of visual data to observe what is presently occurring or has occurred in the locations and potentially report about those observations. Accordingly, when camera-equipped vehicles are further combined with computing devices that have the ability to process the visual data in the vehicle locally, each vehicle becomes a mobile observation platform.

Using vehicles as mobile observation platforms avoids difficulties associated with reviewing and offloading the collected visual data from the vehicles. That is, locally processing the visual data provides for making determinations about events, objects, and so on by the vehicles without incurring costs associated with offloading the bulk visual data from all of the vehicles for review by a central authority. For example, in one approach, a query system generates visual queries and provides the visual queries to a targeted set of the vehicles to ensure efficient use of available resources while also improving the likelihood of detecting the subject being sought.

In a broad context, the query system can generate searches for individual people, vehicles, groups of people, animals, and more generally any visual combination of elements that a machine vision model can be trained to identify. Thus, in one aspect, the query system accepts visual inputs as training data. The visual inputs may be video, and/or still images of the subject (e.g., a particular person, vehicle, arrangement of elements, etc.). Using the visual inputs as a representative sample of the subject, the query system trains a machine vision model to recognize the subject from acquired visual data.

Consequently, the query system, in one aspect, selectively distributes the machine vision model by communicating the model as a visual query to the vehicles. In one embodiment, the query system selects which vehicles receive the visual query according to which vehicles are presently located within an area of interest or have been previously located in such an area during a time when the subject may have been present. In this way, the query system searches among an inventory of visual data that is distributed across a network of vehicles. In one embodiment, vehicles that are equipped with at least one camera and computing resources sufficient to execute the machine vision model may be selected by the query system to perform the visual query. In one aspect, such vehicles may include autonomous vehicles, vehicles with advanced driving assistance systems (ADAS), or any other vehicle that includes a computing device capable of executing a machine vision model.

In either case, the query system selects the vehicle or vehicles that receive the visual query according to known locations of the vehicles. The vision system of each separate selected vehicle then analyzes the associated visual data from a visual inventory of the vehicle according to the machine vision model included within the visual query. The vision system is capable of identifying relevant visual content as a function of the machine vision model being trained to recognize the subject.

As such, when the vision system identifies the subject within the visual inventory from the vehicle, the vision system communicates the identification to the query system. Communicating a simple affirmative message in place of bulk video, which may or may not include the subject, avoids excessive use of communications bandwidth. In this way, the query system and the vision systems within the distributed vehicles function together to improve the efficiency of processing visual data while also leveraging a wide network of available devices to execute the observations.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vision system 170 that is implemented to perform methods and individual functions as disclosed herein relating to collecting and querying visual data. The noted functions and methods will become more apparent with a further discussion of the figures.

Figure 2:
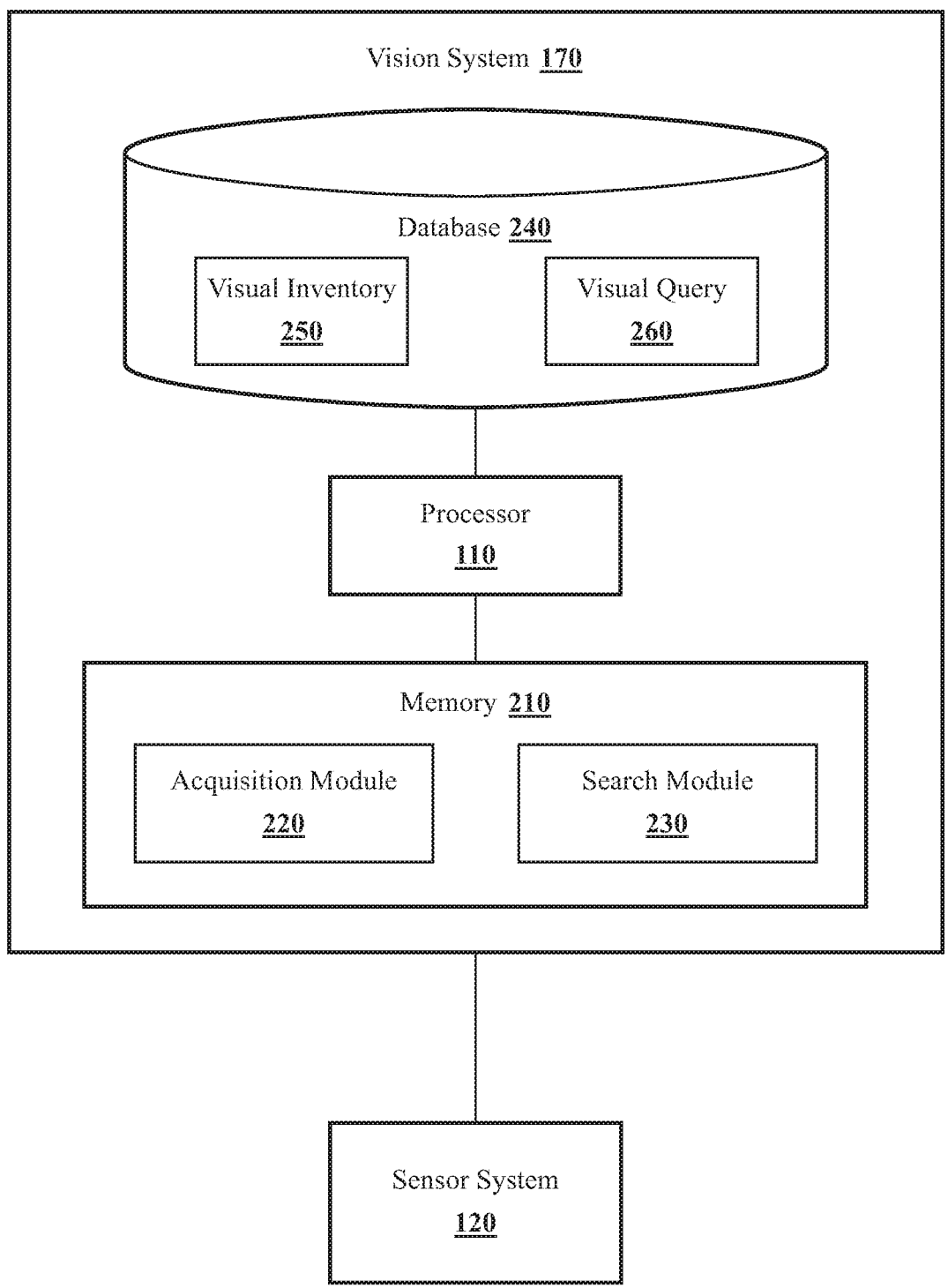
FIG. 2 illustrates one embodiment of a vision system that is associated with analyzing visual data according to a visual query.
Figure 3:
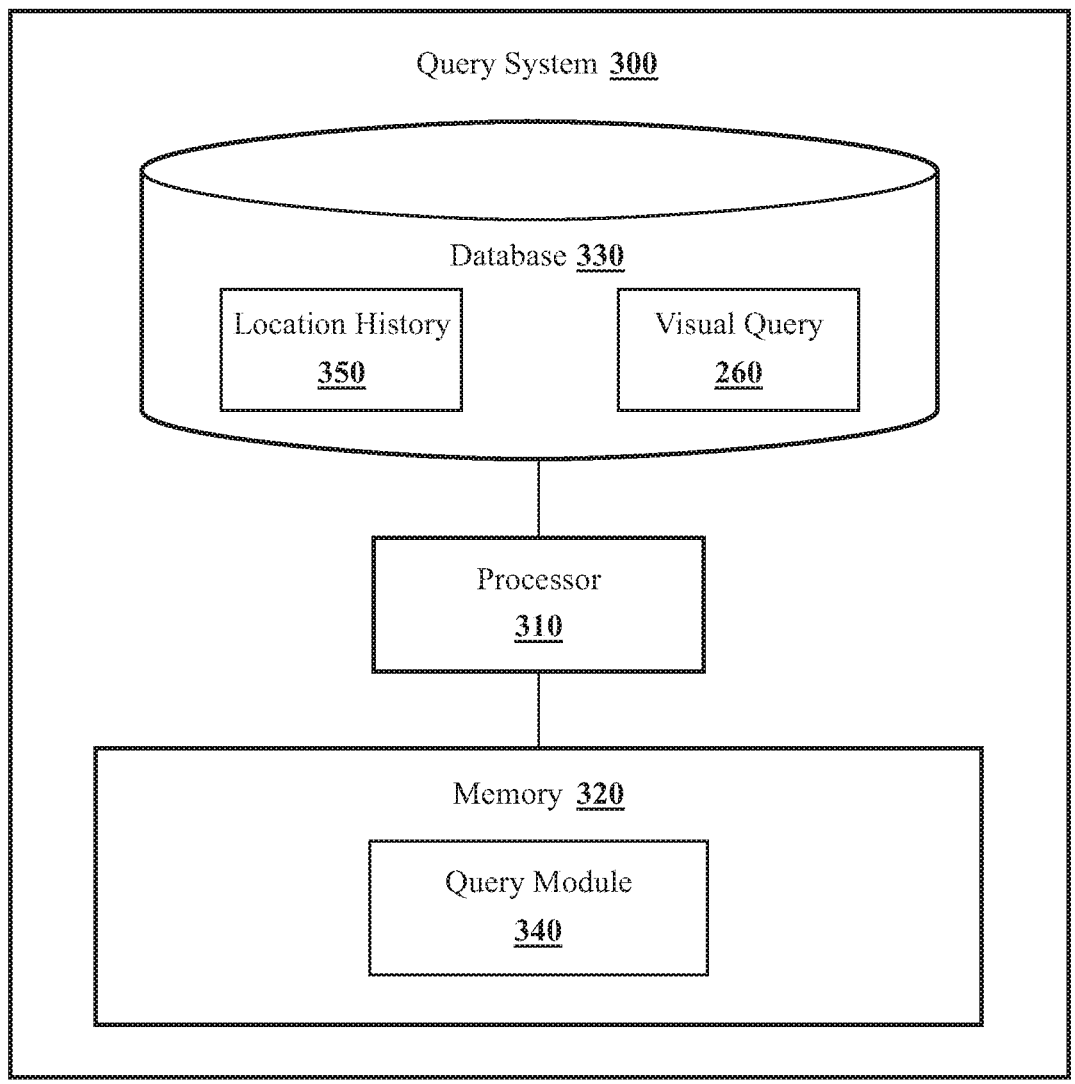
FIG. 3 illustrates one embodiment of a query system that is associated with generating visual queries.

With reference to FIG. 2, one embodiment of the vision system 170 of FIG. 1 is further illustrated. The vision system 170 is shown as including a processor 110 from the vehicle 100 of FIG. 1. Accordingly, the processor 110 may be a part of the vision system 170, the vision system 170 may include a separate processor from the processor 110 of the vehicle 100 or the vision system 170 may access the processor 110 through a data bus or another communication path. In either case, it is generally understood that the processor 110 is a microprocessor or other electronic processing device that is configured with computing resources capable of performing the functions (e.g., executing machine learning algorithms) disclosed herein.

In one embodiment, the vision system 170 includes a memory 210 that stores an acquisition module 220 and a search module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the acquisition module 220 generally includes instructions that function to control the processor 110 to receive data inputs from sensors of the vehicle 100. The present discussion will focus on collection of video data from a camera 126; however, it should be appreciated that the disclosed approach can be extended to cover further configurations of sensors such as LiDAR sensors, multiple cameras covering a three-hundred and sixty-degree view around the vehicle 100, combinations of different types of cameras, audio recorders, and so on. Accordingly, the acquisition module 220, in one embodiment, controls the respective sensors to provide the data inputs in the form of the visual inventory 250.

As an additional note, while the acquisition module 220 is discussed as controlling the various sensors to provide the data inputs that form the visual inventory 250, in one or more embodiments, the acquisition module 220 can employ other techniques to acquire the visual inventory 250 that are either active or passive. For example, the acquisition module 220 may passively sniff the data inputs from a stream of electronic information provided by the various sensors to further components within the vehicle 100. The visual inventory 250 is, in one embodiment, a collection of multimedia data (e.g., video, still images, audio, etc.) that embodies observations of a surrounding environment of the vehicle 100. In general, as provided for herein, the acquisition module 220 receives the multimedia data (e.g., video data) from the respective sensors and can either proceed by directly storing the video data in the visual inventory 250 or by executing one or more pre-processing routines on the video data to generate labels and other metadata that may be used to pre-filter the video data.

The visual inventory 250, in one embodiment, includes camera images and/or video from the camera 126 and other sensors along with metadata. In further embodiments, the visual inventory 250 includes information from further sensors (e.g., an IMU) that may be used to perform various tasks (e.g., motion blur correction) in support of the processes noted herein. Additionally, while the visual inventory 250 is generally discussed as including video data, still images, and other visually-based sensor data, in further aspects, the visual inventory 250 also includes audio data associated with the video data and/or from separate sensors such as external microphones. Moreover, the visual inventory 250, in further embodiments, also includes radar data, LiDAR data, and so on.

Furthermore, in one embodiment, the vision system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes visual inventory 250 along with, for example, other information that is used by the modules 220 and 230 such as the visual query 260. The visual query 260 is, for example, received from a remote device (e.g., cloud-computing system) and generally includes search parameters that define a time window, relevant metadata, a location, and so on. Additionally, in one embodiment, the visual query 260 includes a machine vision model that is pre-trained to recognize particular visual content associated with a subject of the visual query.

As a further explanation of the machine vision model and the visual query 260 briefly consider FIG. 2, which illustrates one embodiment of a query system 300. As illustrated the query system 300 includes a processor 310, a memory 320, and a database 330 which are all similar to corresponding components of the vision system 170. However, in one embodiment, the query system 300 is implemented as a cloud-computing system that includes resources distributed across multiple different computing devices and generally connected via wired or wireless data connections. In either case, the query system 300 generally functions to generate and communicate the visual query 260 to the vision system 170 as implemented in various distributed vehicles. In one embodiment, a query module 340, which includes computer-readable instructions, executes on the processor 310 to produce the visual query 260.

For example, either through automated processes or direct manual inputs, the query system 300 initially receives a request to execute a query. The request is generally an electronic input to the query module 340 that includes indicates various attributes of the query. In one embodiment, the request includes general attributes such as a geographic area or point of interest that is associated with the query. That is, in various aspects, the visual query 260 is defined according to a geofenced area. The area may be as refined as a single geographic point (e.g., an intersection) or provided with broader bounds such as a city precinct, whole city, state, etc. In general, the area within which the query module 340 defines the visual query 260 is flexible to include whatever bounds that are desired.

Additionally, the request can further specify a time window (e.g., date and window of time) that correlates with a likely presence of the subject in the location. In this way, the query module 340 targets the visual query 260 according to a likely presence of the visual information in the form of a selective time and place that is searched. Moreover, in further aspects, the query module 340 can generate the visual query 260 to specify that real-time visual data is to be searched. That is, the visual query 260 is directed to a query over live video data that is presently being acquired by the vehicles. In still further aspects, the query module 340 generates the visual query 260 to include a history of visual data along with real-time video data. For example, the query module 340 may generate the visual query 260 to specify a time window of from 6 AM today until the present which includes stored data and real-time data.

The query module 340 further receives visual data as part of the request to generate the query. The visual data is either a collection of still images or video that include the subject (e.g., person, vehicle, etc.). The query module 340 uses the visual data from the request as training data to train the machine vision model. The process of training the machine vision model can include providing the visual data from the request along with further video/images and backpropagating indications about whether the machine vision model accurately identified the subject between the two sets of information. Of course, the query module 340 may implement other forms of training as may be understood for machine learning algorithms. In one embodiment, the machine vision model is a machine learning algorithm such as a convolutional neural network (CNN), a variational autoencoder, or other machine learning algorithm/deep learning framework that is capable of recognizing objects within video and images. For example, in one approach, the machine vision model is implemented from TensorFlow, MXnet, or a similar framework. In either case, the resulting machine vision model is generally integrated as part of the visual query 260 in order to provide the vehicles with a mechanism to detect visually-based content of interest from the visual inventory.

Moreover, in one embodiment, the query module 340 may not receive visual data but instead may receive a pre-trained machine learning model that is designed to execute a particular machine vision task such as identifying license plate numbers, identifying community blight (e.g., trash, graffiti, etc.), identifying potholes, and so on. Accordingly, in such cases, the machine vision model is, for example, more generalized for identifying a broader range of visual characteristics that correlate with an overall condition or characteristics of the environment. Such pre-configured models may also be implemented in relation to other vision tasks such as natural disasters (e.g., flooding, downed trees, downed power lines, etc.), weather conditions (e.g., snow, ice, etc.), driving behaviors of classes of vehicles (e.g., school buses), and so on.

In still further aspects, the query module 340 may refine pre-configured models in place of training a machine vision model. For example, the query module 340 uses a license plate number identification model and loads a particular license plate number that the model is to identify. As another example, the query module 340 further trains a facial recognition model on a set of photographs of a person. Moreover, in one or more approaches, the pre-configured models may be installed within the vision system 170 that is integrated with the vehicle 100. Thus, in such a case, the query module 340 generates the visual query 260 to include the additional search parameters (e.g., license plate number, photographs, etc.) that are used to modify the pre-configured models at the vehicle 100.

Furthermore, the query system 300 selects which vehicles receive the visual query 260 according to a location history 350. The location history 350 represents reports about historical locations of each vehicle within the distributed network. That is, in one embodiment, each vehicle reports a current location at, for example, regular time intervals or as a log at the completion of each trip. The query system 300 stores the reported locations along with times of when a vehicle was at the locations in order to maintain the location history 300 as an index to available visual inventory from the vehicles. That is, the location history 350 provides insights to the query module 340 about what visual data may be stored within each vehicle.

Thus, the query module 340 references the location history 350 against the provided query request to select vehicles that are to receive the visual query 260. In general, the query module 340 selects the vehicles according to whether the vehicles were in a location specified in the query within a time window that correlates with the request. In a further embodiment, the location history 350 may also include tags for video data associated with each location/timestamp. That is, the vision system 170 within the vehicle 100, in one embodiment, performs an initial analysis of visual data as the visual data is acquired. For example, the vision system 170 may process the visual data according to a semantic segmentation approach that uses a built-in machine learning algorithm (e.g., deep neural network) to identify various objects and boundaries between the objects.

The vision system 170 uses the identifications to tag the resulting visual data with object classes that are present therein. In one embodiment, the vision system 170 acquires the tags from other built-in functionality of the vehicle such as an autonomous driving module 160 or another intelligent system that processes the visual data. In either case, when such data is available, the vision system 170 uploads the tags along with the location history reporting in order to inform the query system 300 of what the vehicle 100 has been observing. This additional information stored within the location history 350 provides the query module 340 with greater fidelity when selecting which vehicles to include for executing the visual query 260.

Accordingly, the query module 340 analyzes the location history 350 against the query request to determine an available set of vehicles that include a visual inventory that is to be queried. In one embodiment, the query module 340 samples from the available set of vehicles instead of communicating the visual query 260 to all of the vehicles in order to economize edge computing resources of the vehicles and avoid redundancies. Furthermore, the query module 340, in one approach, refines the available set according to the tags for present classes of objects in the visual inventory of various vehicles at the times and locations. In this way, the query module 340 more precisely targets the visual query 260.

Additionally, in one embodiment, an original equipment manufacturer (OEM) or other entity provides the vision systems within the vehicles as a service within a marketplace. For example, a city may desire to identify potholes within roadways. Accordingly, the OEM can sell access to vision systems on vehicles within a particular location of the city at a rate according to a number of vehicles included, an overall computation time, and so on. As a further example, another entity may wish to identify trash for Earth Day. Accordingly, the vision systems of the vehicles can be provided with visual queries that identify and report trash. In still further examples, government entities may leverage the vision systems to assist in Amber Alerts or the pursuit of criminals driving a known vehicle. Thus, the presently disclosed systems and methods can be leveraged for many applications beyond traditional surveillance.

Continuing with the vision system of FIG. 2, the acquisition module 220, in one embodiment, is configured to collect the visual inventory 250 from the sensors of the vehicle 100. As previously indicated, the acquisition module 220 generally collects visual data in the form of video and/or still images from one or more cameras 126 of the vehicle. Thus, the acquisition module 220 generally collects the visual data as the sensors generate the visual data. The acquisition module 220 then, in one embodiment, pre-processes the visual data. For example, the acquisition module 220 pre-processes the data by compressing the visual data, formatting the visual data into data structures of the visual inventory 250, executing object recognition tasks on the visual data, time/location stamping the visual data, and so on.

In one embodiment, the acquisition module 220 includes a neural network (e.g., convolutional neural network) that processes the visual data to generate semantic labels in order to identify various object classes present therein. In further implementations, the acquisition module 220 implements different approaches for performing the semantic segmentation which can include deep convolutional encoder-decoder architectures, a multi-scale context aggregation approach using dilated convolutions, or another suitable approach that generates the semantic labels for the separate object classes represented in the visual data.

The acquisition module 220 may further include instructions to communicate reports to the query system 300. For example, the acquisition module 220, in one approach, periodically communicates a current location to the query system 300 so that the query system 300 can establish a history for the vehicle 100. Additionally, in one embodiment, the acquisition module 220 also provides the tags/labels for recently acquired visual data. In this way, the acquisition module 220 provides the query system 300 with further context about the collected information. In further aspects, the acquisition module 220 stores the labels/tags with the visual data in the visual inventory 250 without communicating the labels to the query system 300 and instead the search module 230 leverages the tags/labels as a pre-filtering mechanism as will be discussed in greater detail subsequently.

In one aspect, when the visual query 260 is initially received, the acquisition module 220 parses the visual query 260 to identify the search parameters (e.g., time window, machine vision model, etc.) and passes the relevant information to the search module 230. The acquisition module 230 uses the time window specified within the visual query 260 to identify one or more segments of data from the visual inventory 250. Accordingly, the acquisition module 220 loads the segments into a working memory for processing by the search module 230. In one embodiment, the acquisition module 220 loads visual data in real-time from the camera(s) 126 for processing by the search module 230. For example, when the visual query 260 indicates that the search is to include visual data from a current location of the vehicle 100, then the acquisition module 220 loads and/or otherwise links the visual data stream from the camera 126 so that the search module 230 can actively process the visual data as it is acquired.

In one embodiment, the search module 230 generally includes instructions that function to control the processor 110 to query visual data in response to receiving a visual query 260 from, for example, the query system 300. That is, the search module 230 analyzes the segments specified by the visual query 260 in order to identify a subject of interest in the visual data. As previously discussed, the search module 230 uses the machine vision model in order to process the visual data and recognize the subject within the data. The machine vision model can take many different forms as previously indicated. However, it should be appreciated that an accuracy of the detection by the machine vision model may vary according to the training of the machine vision model, quality of the visual data, and so on.

Accordingly, the search module 230 can further implement thresholds for reporting a positive identification of visual content related to the subject. That is, the search module 230 or the visual query 260 can define a probability that is to be satisfied by a positive identification before reporting to the query system 300. In this way, the search module 230 can avoid false positives for critical searches (e.g., Amber Alerts) while also dynamically adjusting the threshold for less critical queries (e.g., graffiti identification) in order to adjust a number of results provided.

In either case, once the search module 230 identifies visual content within one or more segments as corresponding to the subject of the visual query 260, the search module 230 communicates a positive indication to the query system 300. The search module 230, in one embodiment, generates the positive indication as a communication including an annotation that the subject has been identified in the visual inventory 250. Accordingly, the communication has a data size that is relatively small in comparison to communicating the actual visual data. In further embodiments, the search module 230 generates the communication to include information about the positive indication beyond a simple positive indication such as a location associated with the visual data, a length of video associated with the positive identification, a time associated with when the visual data was acquired, and so on. In still further aspects, the search module 230 generates the communication to include at least some of the visual data including the subject. For example, the communication can include a screenshot, a short video sample clip, and so on. In yet further aspects, the search module 230 communicates the visual data that includes the positive identification of the subject. Of course, depending on the particular implementation different forms of the reporting communication can be implemented and the above examples are intended as examples and not as an exhaustive listing.

Moreover, the query system 300, in one embodiment, controls which data is communicated in response to a positive identification. For example, the query system 300 may initially generate the visual query 260 to specify which information is reported upon a positive identification. For example, the query module 340 may generate the visual query 260 to specify a confirmation by the query system 300 before uploading the visual data from the vision system 170. Accordingly, in this example, when the search module 230 communicates the positive indication, the initial communication includes the simple affirmation of the subject being identified.

Once the communication is received in the query system 300, the search module 230 determines whether the visual data is to be uploaded or not. The search module 230 may base the determination about whether to upload directly from the vehicle 100 according to various conditions. The conditions include, in one approach, how many other vehicles are reporting positive identifications, current available bandwidth, a current type of communication link with the vehicle 100 (e.g., cellular or home network), the confidence interval of the identification, an immediacy of further reviewing the visual data (e.g., Amber Alert vs graffiti reporting), and so on. In further embodiments, the positive indication by the search module 230 initiates further analysis as will be discussed subsequently in relation to FIG. 7.

Figure 4:
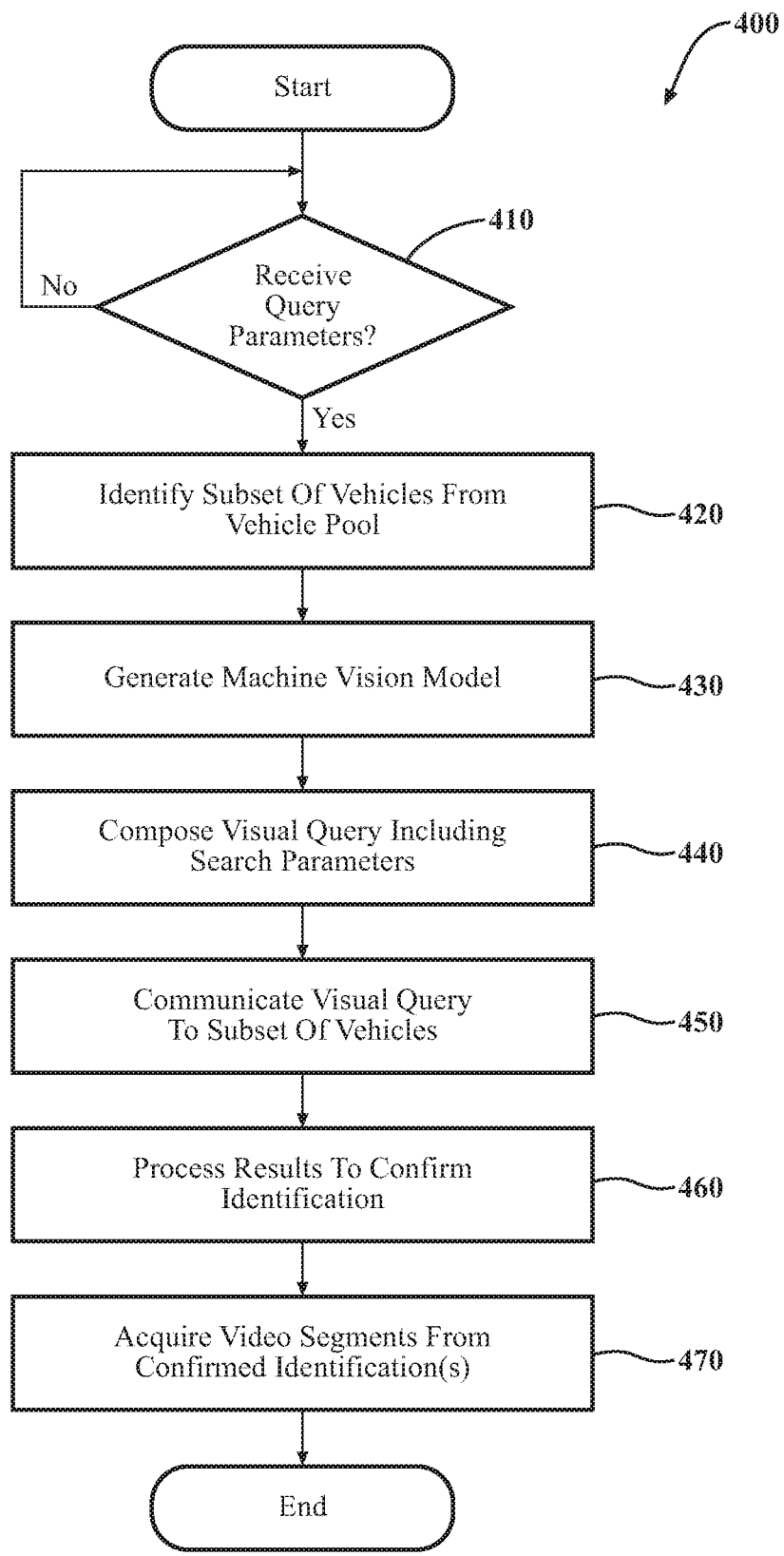
FIG. 4 illustrates one embodiment of a method associated with generating a visual query and selectively providing the visual query to a subset of available vehicles.

Additional aspects of querying a visual inventory of data across a distributed network of vehicles will be discussed in relation to FIG. 4. FIG. 4 illustrates a flowchart of a method 400 that is associated with generating and distributing a visual query to network of vehicles. Method 400 will be discussed from the perspective of the query system 300 of FIG. 3. While method 400 is discussed in combination with the query system 300, it should be appreciated that the method 400 is not limited to being implemented within the query system 300, but is instead one example of a system that may implement the method 400.

At 410, the query system 300 monitors for electronic inputs specifying a query request. In one embodiment, monitoring for the query request includes monitoring one or more electronic buffers within the query system 300 that store communications received over wired and/or wireless communication links. This periodic checking of the buffers can include scanning received communications for the query parameters and/or other indicators that specify the electronic input is for the creation of a visual query. Moreover, in one embodiment, the query request includes visual content or at least descriptions of visual content that is to be searched. In further aspects, the query request also includes search parameters that identify a targeted location (e.g., GPS coordinates specifying a geofence, government boundaries, etc.), and/or a time window that indicates a time span (e.g., past date and time, real-time, etc.) for searching corresponding visual data associated with the targeted location. In one embodiment, the time window indicates a start and stop day and time within which to search a visual inventory of previously acquired visual data. Upon receiving the electronic inputs, the query system proceeds with generating the visual query 260 as specified further below.

In further aspects, the query request indicates termination parameters for indicating when the visual query is to be terminated. For example, in the context of a real-time search of visual data that is ongoing, the query request can indicate various conditions for terminating the query. These smart termination parameters, in one approach, indicate a frequency of detections for an object of interest (e.g., specific vehicle) prior to terminating the query within a vehicle executing the query. Thus, the query system 300 can communicate detections to the vehicles executing the visual query so that the vehicles can be aware of a current state of the query and determine when the termination parameters have been satisfied. In further aspects, the termination parameter can include one or more of a frequency of detections for the visual content (e.g., detection quota), a time limit, a data quota (e.g., exceeding defined bandwidth usage), a stop request (e.g., an active request from the query system 300), and so on.

As a further example, the query system 300, in one approach, actively controls which vehicles are participating in the visual query. Thus, as the query system 300 receives results from an on-going analysis of real-time visual data, the query system 300 can selectively adjust a geofenced area within which the visual query is being executed. For example, if a vehicle in a particular location identifies the visual content, then the query system 300 may terminate vehicles executing the query outside of a defined distance from the detection. In still further aspects, the query system 300 may activate further vehicles to begin executing the visual query according to a detected location of the visual content. For example, additional vehicles along a predicted route that correlates with a detected trajectory of the detected visual content (e.g., pedestrian or vehicle). In any case, the visual query can specify various parameters to define when a query is to be terminated that can be statically defined or dynamically defined according to evolving characteristics of a situation.

At 420, the query system 300 identifies a pool of available vehicles that correspond with the search parameters. For example, the query system 300 cross-correlates the specified location and time window against the location history 350 to identify which vehicles were located at the targeted location during the time window. Of course, in the context of a real-time visual query, the query system 300 identifies the subset according to current locations of the vehicles. In either case, the query system 300 identifies which vehicles correlate with the indicated search parameters in order to provide the subset as vehicles that likely include visual data about the indicated visual content (i.e., subject of interest).

At 430, the query system 300 generates the machine vision model. As previously described, the query system 300, in various circumstances and embodiments, undertakes different approaches to generating the machine vision model. That is, the query system 300 can train the machine vision model wholly from acquired visual data about the subject, modify a pre-configured machine vision model according to the visual content, use a pre-configured machine vision model without any modifications, provide modification data within the visual query in place of machine vision model for the vision system 170 to adjust pre-loaded machine vision models, and so on. In either case, the query system 300, either independently or through the use of associated cloud-computing resources, provides for a machine vision model that is trained to recognize the particular visual content.

At 440, the query system 300 generates the visual query 260 from the search parameters and the machine vision model. The query system 300 generally produces the visual query 260 as an electronic data structure that is formatted according to application-level protocols of a data communication stack. Thus, the visual query 260 may be provided as a single communication or segmented into several data packets. In further aspects, the query system 300 generates the visual query 260 as one communication and the machine vision model as a separate communication. Moreover, depending on a data size of the machine vision model alternative communication pathways may be leveraged to provide the machine vision model into the vision system 170. In one approach, the machine vision model is provided via an alternative communication network such as a vehicle-to-vehicle (V2V) network, a vehicle-to-infrastructure (V2I) network, or another suitable communication network.

At 450, the query system 300 communicates the visual query 260 to a sample/subset of vehicles from the pool as previously identified. Thus, the visual query 300 is the payload of an electronic communication that is, for example, a multi-cast communication directed to the vehicles of the subset. Moreover, the query system 300 generally designs the communication to cause the selected vehicles of the subset to execute the visual query 260 upon reception.

At 460, the query system 300 processes results received in response to communicating the visual query 260. That is, in one embodiment, after some pre-defined time permitted for the subset of vehicles to execute the visual query 260, the query system 300 processes received results in order to determine if the subject has been identified. In a further embodiment, the query system 300 processes the results when the results are received. In either case, the query system 300 processes the results of positive indications to determine whether to request additional information (e.g., request upload of relevant video data) about the segments of the visual data including the identified visual content. In one or more embodiments, the query system 300 bases the confirmation of the results on, for example, indicated confidence intervals for the identifications, indicated timestamps of the video segments, precise locations associated with the video segments, object class labels for identified objects in the video segments, and so on.

At 470, the query system 300 acquires the video segments from confirmed identifications. In one embodiment, the query system 300 acquires the video segments by requesting the vision system 170 to immediately upload the video segments. In further aspects, the query system 300 requests a delayed upload to defer the upload to when the vehicle is connected via a cost-effective network (e.g., home network vs. a cellular network). Moreover, the query system 300 can generally control the upload of the visual data from the vehicle in whichever configuration is desirable. Thus, the query system 300 can indicate that part of the visual data is to be uploaded immediately (e.g., most relevant portions) while secondary segments of the visual data that may occur before and after the detection be uploaded subsequently over a home network. In either case, the query system 300 generally indicates when to upload the visual data and to upload the data that is of particular relevance with affirmative identifications of the visual content. In this way, the query system 300 provides for efficient use of available resources while avoiding the use of bandwidth for bulk uploading of visual data that is not relevant.

Figure 5:
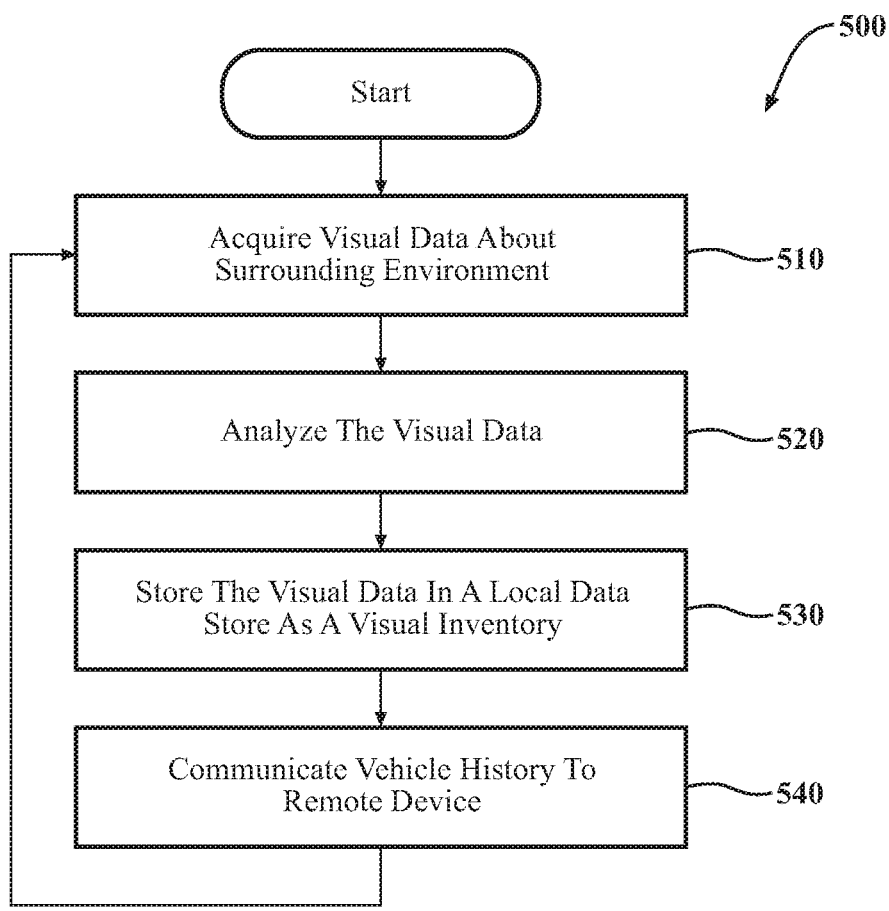
FIG. 5 illustrates one embodiment of a method associated with collecting visual data.
Figure 6:
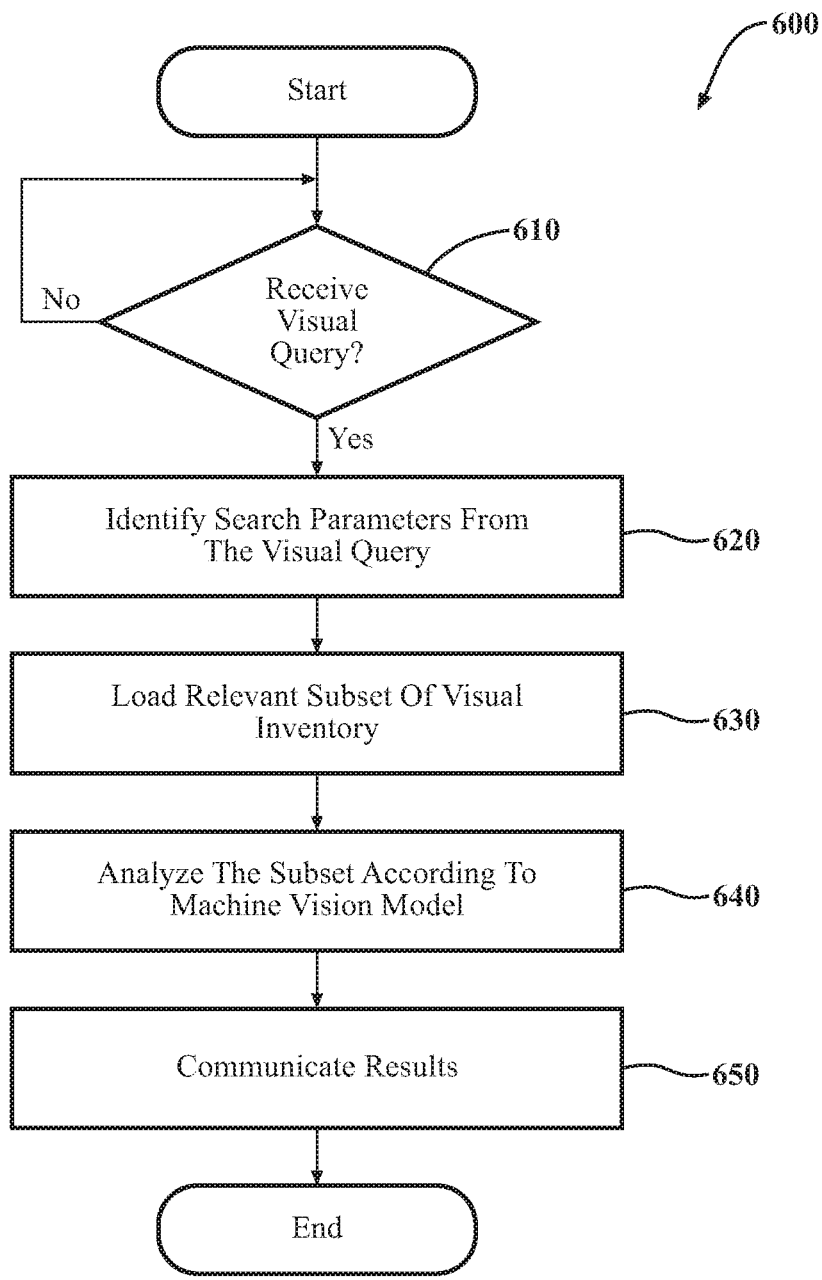
FIG. 6 illustrates one embodiment associated with executing a visual query.
Figure 7:
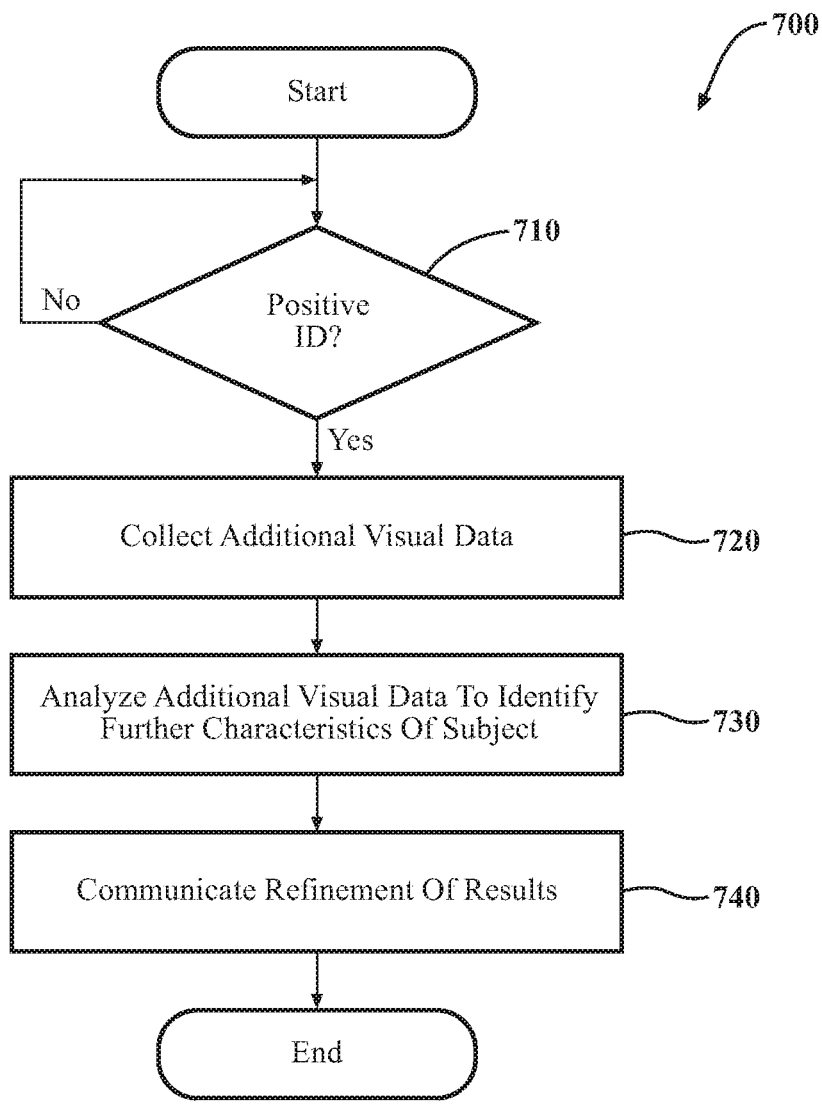
FIG. 7 illustrates one embodiment of a method associated with collecting additional data in real-time about an identified subject.

Further aspects of querying visual data by using edge computing resources of collection devices (e.g., vehicles) in a distributed network will be discussed in relation to FIGS. 5, 6, and 7. FIGS. 5, 6, and 7 illustrate flowcharts of methods 500, 600, and 700 that are associated with various aspects of collecting visual data and analyzing the visual data according to a visual query. Methods 500, 600, and 700 will be discussed from the perspective of the vision system 170 of FIGS. 1 and 2. While methods 500, 600, and 700 are discussed in combination with the vision system 170, it should be appreciated that the methods 500, 600, and 700 are not limited to being implemented within the vision system 170 but is instead one example of a system that may implement the methods 500, 600, and 700.

At 510, the acquisition module 220 controls the at least one camera 126 of the vehicle 100 to acquire video data as a video stream about a surrounding environment of the vehicle 100. As part of controlling the sensors to acquire the visual inventory 250, it is generally understood that the sensors acquire the visual inventory 250 of a region around vehicle 100 that encompasses the surrounding environment of the vehicle 100. In one embodiment, the visual inventory 250 may include visual data that only partially overlaps between cameras. However, in general, the visual inventory 250 is not necessarily a complete view of the surrounding environment but does at least include an area forward of the vehicle 100 that is generally in the direction of travel of the vehicle 100. Thus, the acquisition module 220, in one embodiment, controls the sensors to acquire the visual inventory 250 of at least an area ahead of the vehicle 100.

At 520, the acquisition module 220 analyzes the video data according to an object recognition model to generate labels for classes of objects represented in the video data. In one embodiment, the acquisition module 220 pre-labels the video data using the labels prior to storing the data in the visual inventory 250. This pre-processing of the video data can provide for finer-grained determinations of which segments of the visual inventory 250 may be relevant to a particular search and thus can be leveraged by the vision system 170 to determine which segments to load in response to a visual query and/or by the query system 300 to determine which vehicles should be selected to receive the visual query 260. In still further embodiments, the acquisition module 220 may skip the pre-processing to conserve computing resources. Moreover, as previously indicated, the pre-processing may be executed by other systems of the vehicle 100 such as the autonomous driving module 160. In such a case, the acquisition module 220, for example, sniffs the labels from a data stream associated with the autonomous driving module 160 to acquire the labels while leveraging the processing of the other components to perform the task. In either case, the labels are generally included within the visual inventory 250 as metadata associated with separate video segments. Thus, the labels can include object class types that are time stamped according to when the objects appear in the video segments.

At 530, the acquisition module 220 stores the video data in the visual inventory 250. In one embodiment, the acquisition module 220 electronically stores the video/visual data in a data structures designed to improve indexing of the various segments to facilitate subsequent querying. Moreover, in one embodiment, the acquisition module 220 selectively purges the visual data according to a first-in-first-out approach that removes the oldest segments from the visual inventory 250 in order to free storage space for new segments. In still further embodiments, the acquisition module 220 uploads at least a portion of the visual inventory 250 to a cloud-storage location associated with, for example, the query system 300 when connected via a cost-effective network such as a home network. In this way, the vision system 170 can, in one embodiment, continuously cycle out old video data while providing storage to acquire new video data.

At 540, the acquisition module 220 communicates a location history of the selected vehicle 100 to a remote device (e.g., the query system 300 or associated cloud-computing elements thereof). In one embodiment, the acquisition module 220 provides the location history as a periodic update (e.g., heartbeat communication) to the query system 300 to maintain the location history in a current state for accurate selection when a visual query is being generated. As a further aspect, the acquisition module 220 module, in one embodiment, electronically communicates the labels from the pre-processing to the remote device (e.g., the query system 300) for pre-filtering of vehicles that are to be selected for querying. Thus, the acquisition module 220 provides both a current location in the form of GPS coordinates along with labels identifying object classes for objects within acquired visual data as a periodic communication to the query system 300. In this way, the vision system 170 develops the visual inventory 250 while also informing the query system about the visual inventory 250 to facilitate generating the visual queries.

Referring now to FIG. 6 and method 600, which illustrate one embodiment of how the vision system 170 processes visual queries. At 610, the acquisition module 220 monitors for a visual query. In one embodiment, the acquisition module 220 monitors for the visual query 260 by periodically checking one or more electronic buffers for received communications and parsing the received communications for the indicators (e.g., indicator flag, etc.) of the visual query 260.

At 620, the acquisition module 220, in response to receiving the visual query at 610, identifies search parameters from the visual query 260 that specify at least visual content that is to be identified. As previously described, the visual content includes, for example, one or more of a person of interest, a group of people, an animal of interest, a specific vehicle, environmental characteristics, objects of interest, individuals in particular poses (e.g., hands to mouth, slumped over, etc.), combinations of the foregoing, and so on. In general, the search parameters specify the visual content by providing the machine vision model pre-trained to recognize the visual content and as part of the visual query. As previously indicated, the exact form of the machine vision model can vary according to a particular visual query. However, the machine vision model is generally a machine learning algorithm that identifies segments of the subset that include the visual content. Accordingly, through analyzing the subset of visual data from the visual inventory 250 using deep neural networks or another suitable approach, the search module 230 can query the visual data to isolate the relevant video segments.

In still further embodiments, the visual query 260 further includes query parameters for pre-filtering the subset and/or termination parameters that indicate when to terminate a query over real-time visual content. In one embodiment, the query parameters indicate object classes for objects associated with the visual content. The object classes correspond to known object classes for which the visual data may be labeled as previously indicated. Moreover, in one embodiment, the search parameters include a time window that indicates a time associated with a location of the selected vehicle 100 that is targeted for querying. That is, the time window generally specifies a past time when the vehicle 100 was located at the search location and thus indicates visual data that is to be loaded for processing. Of course, as previously specified, the time window may also indicate that real-time visual data is to be searched.

Accordingly, the termination parameters can indicate various conditions that are, for example, continuously considered by the system 170 to determine when to terminate an ongoing analysis of the real-time video. In various approaches, the termination parameters can indicate quotas or thresholds for intelligently determining when to stop analyzing the real-time visual content for a visual query. As previously indicated, the termination parameters can indicate one or more of a frequency of detections for the visual content, an estimated accuracy of one or more detections, a time limit for continuing the visual query, a geofenced area within which to contain the visual query, a data quota for individual vehicles or for the visual query overall beyond which the visual query is terminated, and so on. In addition, or alternatively, the query system 300 may provide an active stop request when the query system acquires results from one or more vehicles that are determined to satisfy the visual query.

At 630, the acquisition module 220 loads the subset of the visual inventory 250 that correlates with the search parameters into a memory (e.g., memory 210). The acquisition module 220 loads the visual data comprising the subset for analysis by the machine vision model. In various approaches, the acquisition module 220 may load an entirety of the visual data that is to be queried or segments thereof depending on available memory. Thus, the acquisition module 220 may iteratively swap the segments into the memory as the search module 230 executes the visual query 260.

At 640, the search module 230 analyzes the subset of the visual inventory 250 to identify whether the subset includes the visual content. As previously discussed, the search module 230 executes the machine vision model on a processor (e.g., processor 110) within the selected vehicle 100 to query the visual data. The machine vision model functions to identify the visual content within the visual data according to the characteristics of the visual content trained into the machine vision model. Thus, the machine vision model may detect various objects, combinations of objects, patterns, and so on. By way of example, the machine vision model may be trained to identify a posture of individuals embodied in the visual data such as a person with their hands up to their mouth. Such a pose may be indicative of a person smoking which is, for example, characteristic of the visual content be queried. For such a determination, the search module 230 can use the machine vision model to identify the person and pose along with providing a probability of the particular action (e.g., smoking). In this way, the search module 230 queries the visual data to isolate particular video segments of interest. As a further example, the machine vision model may alternatively or additionally be trained to identify faces of people, particular cars, persons wearing particular clothing (e.g., backpacks), environmental conditions, temporal events (e.g., car accidents), and so on. Additionally, the search module 230, in one embodiment, further identifies characteristics of the visual content such as a heading of a vehicle, a number of passengers in a vehicle, additional individuals proximate to a subject of interest, and so on.

At 650, the search module 230 communicates detection results about whether the subset includes the visual content. In one embodiment, the search module 230 communicates a positive indication when the subject is detected and may provide no communication when the subject is not detected. Moreover, the information that is communicated may vary according to specifications of the visual query 260. That is, as previously discussed, the visual query 260 can specify that only textual responses are provided, that snapshots of the visual data are provided, that the entire video segment corresponding to the positive identification is provided, and so on. Moreover, the search module 230, in one embodiment, can provide the detection results over one or more communications depending on the particular implementation. Thus, in one aspect, the search module 230 provides an initial communicating indicating the positive identification and then follows with additional communications including further information (e.g., video data) once confirmed by the query system 300 or other controlling cloud-computing entity.

Referring now to FIG. 7 and method 700, which illustrates one embodiment of how the vision system 170 performs additional processing in response to a positive identification. At 710, the search module 230 determines if there is a positive identification of the visual content. If the search module 230 has identified that the visual content of interest exists in the subset, then the search module 230 proceeds to collect additional information as discussed at block 720. Otherwise, the search module 230 continues to process the visual data and perform the visual query 260.

At 720, the acquisition module 220 collects, in real-time, additional visual data. It should be noted, that in general, the functions discussed in relation to method 700 relate to a query of real-time visual data presently being acquired by the vehicle 100. Thus, when the search module 230 has a positive identification for the visual query 260, there is likely further or ongoing information to be identified from the visual data being presently acquired. Accordingly, the search module 230 indicates to the acquisition module 220 that a stream of visual data from the at least one camera 126 should be provided for further analysis.

In one embodiment, the search module 230, at 720, also broadcasts or otherwise communicates to other vehicles that are nearby the positive identification. The search module 230 can provide the positive indication to the nearby vehicles to cause the nearby vehicles to collect visual data about the subject. Thus, the search module 230 functions to initiate a swarm of data collection about the positive identification in order to acquire as much visual data as possible about the subject.

At 730, the search module 230 analyzes the additional visual data. In one embodiment, the search module 230 analyzes the additional data according to the machine vision model to further identify the characteristics of the subject. In further aspects, the vision system 170 includes additional machine learning algorithms for determining aspects of an identified subject such as current condition, heading, whether nearby persons are associated with the subject, and so on. Accordingly, the search module 230, in one approach, applies the additional algorithms to the additional visual data to generate additional characteristics about the subject. In this way, the vision system 170 provides for improving awareness about the subject beyond simply identifying the subject in the visual data.

At 740, the search module 230 communicates a refinement to the detection results that includes at least the identified additional characteristics from the additional visual data. Accordingly, in one embodiment, the search module 230 generates additional communications to provide the refinements to the query system 300. It should be noted that in addition to the refinements, the other alerted nearby vehicles are also acquiring and processing visual data about the subject and thus the query system 300 is further receiving information from the nearby vehicles to improve awareness about the subject.

Figure 8:
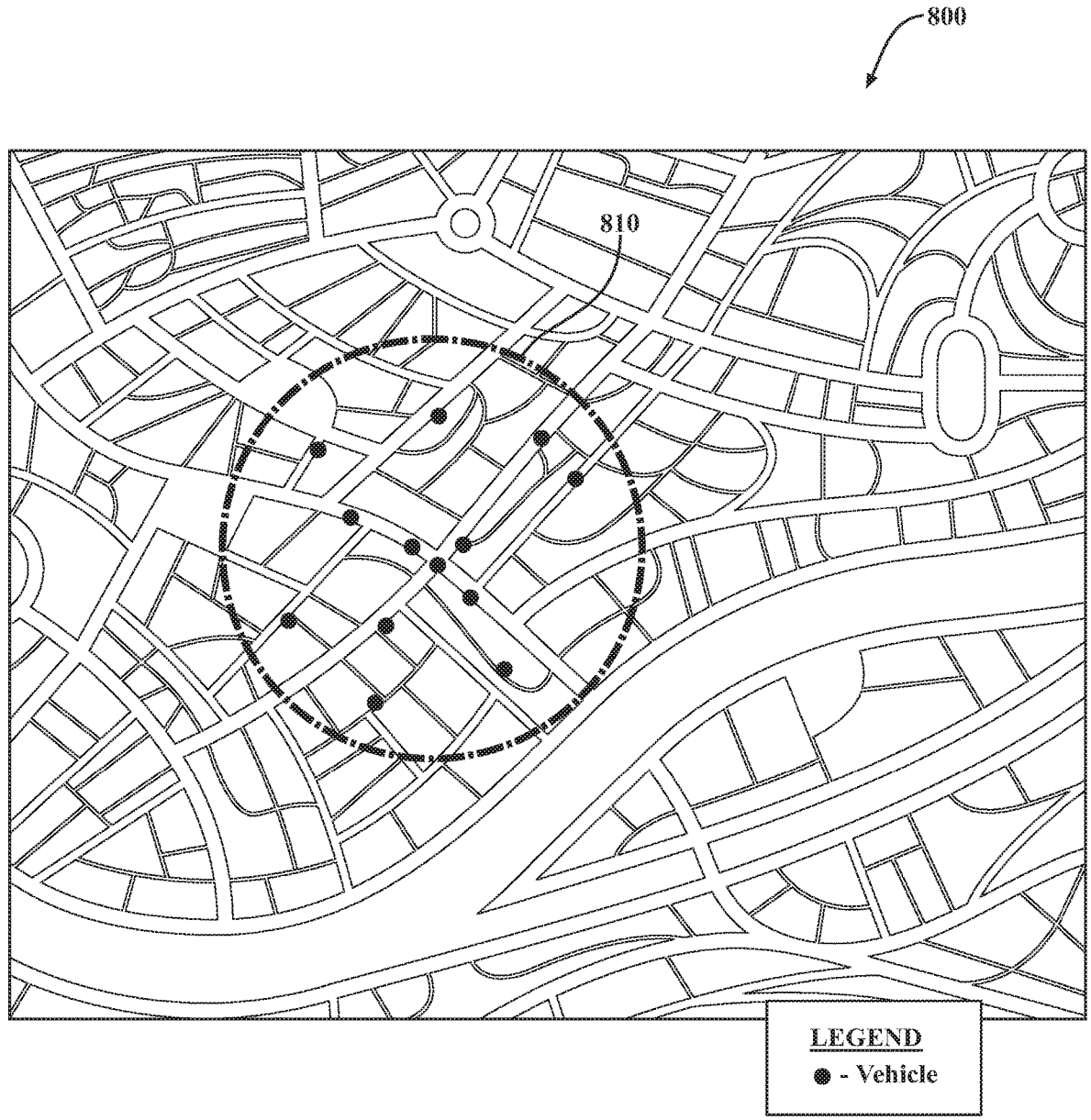
FIG. 8 illustrates one example of a search region and available vehicles within the search region.
Figure 9:
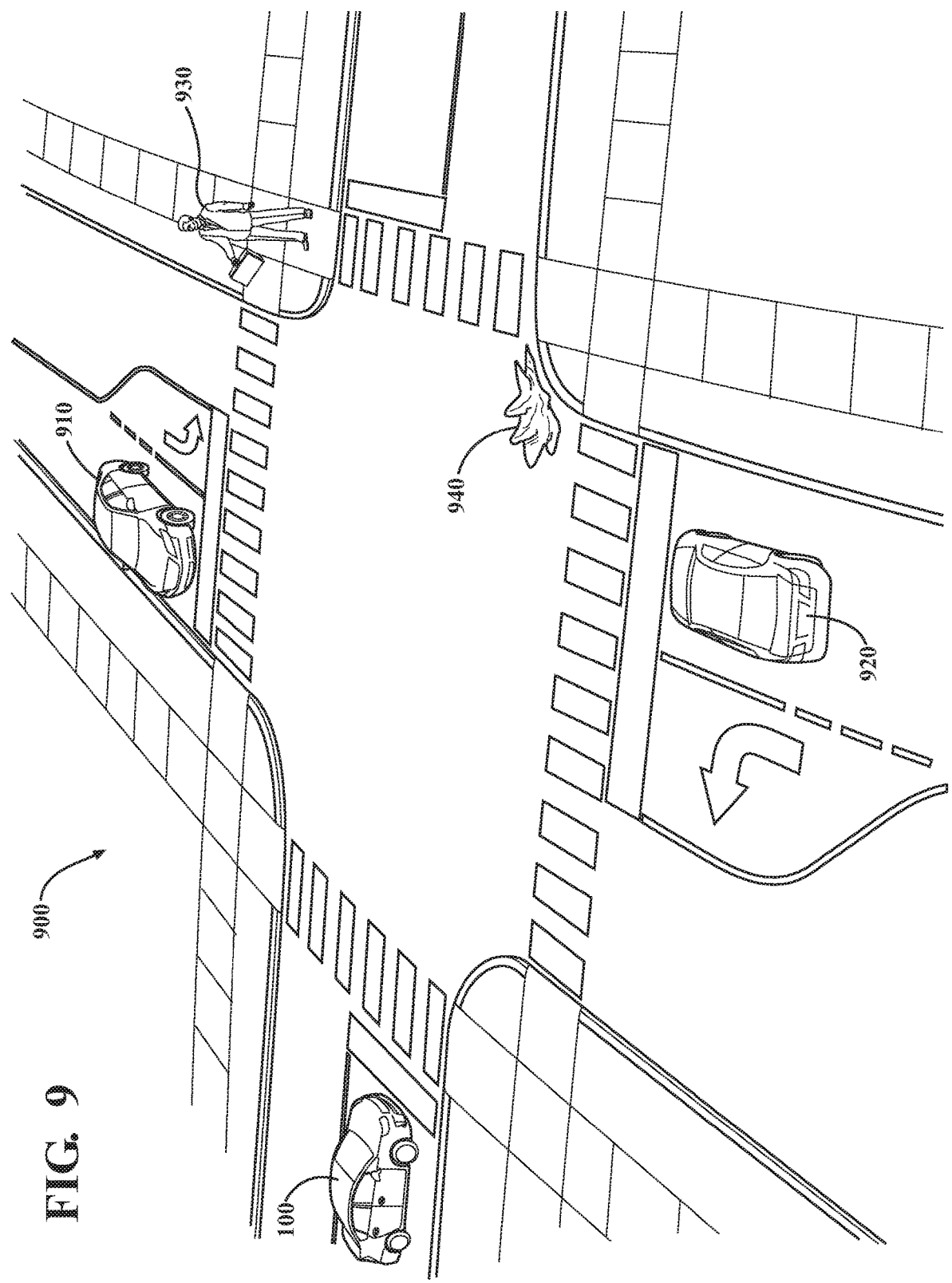
FIG. 9 illustrates one example of an intersection for which a vehicle collects and analyzes visual data for a visual query.

As a further explanation of how the vision system 170 and the query system 300 improve the querying of visual data, consider FIGS. 8 and 9. FIG. 8 illustrates an example area 800 within which vehicles include the vision system 170 are operating. Further consider that a search location 810 is defined by a circle that is centered about an intersection where, for example, a subject of interest was last observed. Thus, by way of example, the query system 300 initially receives electronic inputs defining a search request that indicates a location defined by the search location 810. In general, the search location can be defined according to GPS coordinates, street boundaries, governmental boundaries (e.g., precincts, cities, counties, etc.), and so on. As illustrated, the search location is defined according to a single GPS coordinate with a radius (e.g., within ½ mile of coordinate A).

Thus, the query system 300 uses the defined search location 810 along with a time window indicated by the search request to determine which vehicles were located within the search region 810 during the time window. The dots within the search region indicate, for example, vehicles that the query system 300 determines to be presently within the search region or have been previously within the search region 810 extending back to one hour before the present time as defined by the time window. The vehicles determined to be present within the search region 810 are illustrated in FIG. 8 using dots within the search location 810. While illustrated at singular points in the search location 810, it should be appreciated that the vehicles include visual data corresponding to a track traveled through the search location 810. In general, the dots are provided as representations of the vehicles at a current time for purposes of discussion.

Accordingly, the query system 300 communicates a visual query to at least a portion of the identified vehicles. As previously explained, the query system 300 may sample available inventory to avoid requesting redundant analysis, according to a budget specified via a mobile vision marketplace by a requesting party, according to available bandwidth, or according to another suitable reason. In either case, consider that the query system 300 generates and provides the visual query as a search for a subject that is a man carrying a suitcase and known to be wearing a particular set of clothing. Thus, the query system 300 provides the visual query with a machine vision model that is trained to recognize the man. As previously mentioned, the query system 300 can generate the machine vision model using various approaches, which will not be revisited here.

As such, the vehicle 100 and other selected vehicles receive the visual query and initiate a search over visual data of respective visual inventories that correspond with the time window and the search location 810. Moreover, because the present visual query further specifies that real-time visual data is to be searched, the vision system 170 begins analyzing a stream of video data from the camera(s) 126 in addition to processing stored visual data. With reference to FIG. 9, an example intersection 900 from within the search location 810 is illustrated. Consider that the illustrated configuration of the intersection 900 is a current view and thus embodies a general view of the vehicle 100 in real-time.

Accordingly, the vision system 170 within the vehicle 100 acquires incoming visual data that includes a vehicle 910, a vehicle 920, a man carrying a suitcase 930, a pothole 940, and other aspects of the intersection 900. The machine vision model being executed by the visual vision system 170 identifies the man 930 as the subject of interest for the visual query. Thus, vision system 170 generates a positive indication and communicates the positive indication to the query system 300 or another listening remote device (e.g., a cloud-computing component associated with the query system 300). Consequently, the vision system 170 may provide the visual data corresponding with the man 930 in the original communication to the query system 300 or as a follow-up, which is dictated by the query system 300.

Additionally, in one approach, the vision system 170 alerts the nearby vehicles 910 and 920 when the nearby vehicles include vision systems 170. Thus, the vehicles 910 and 920, if not already involved with the visual query begin actively querying visual data and providing information about the man 930. Moreover, in one embodiment, the vision system 170 of the vehicle 100 and the respective nearby vehicles 910 and 920 track and acquires additional characteristics about the identified man 930. Thus, the vehicles may process visual data acquired about the man 930 using built-in machine vision models or the machine vision model provided by the original visual query. In either case, once identified and alerted to the presence of the subject of the visual query, the vehicles 100, 910, and 920 provide refinements to the original identification through acquiring and analyzing the additional visual data.

As a further example of how the vision system 170 functions, consider that the intersection 900 also includes a pothole 940. Further consider that the visual query is directed to identifying potholes within the search region 810 instead of the man 930. Accordingly, the vision system 170 upon approaching the intersection 900 identifies the pothole 940 in video data acquired of the intersection 900. As a result, the vision system 170 communicates a location of the pothole 940 and/or an image of the pothole 940 to the query system 300 to inform the query system 300 about the pothole. Moreover, in further aspects, the vision system 170 communicates the presence of the pothole 940 to the nearby vehicles 910 and 920 through vehicle-to-vehicle (V2V) communications, via a cloud-computing system (e.g., the query system 300), or through another suitable communication mechanism. In either case, the vision system 170 functions as a mobile vision platform that can query real-time or previously acquired visual data in order to identify visual content of interest without the need to offload bulk visual data and while providing the flexibility of being mobile in contrast to static infrastructure cameras.

As a further example of how the termination parameters may be employed, consider that the termination parameters within the visual query or as monitored by the query system 300 specify that the visual query over real-time visual data for the man 930 is to be terminated after two positive identifications within a twenty minute time window and within a one-half mile radius of one another. Accordingly, if the vehicle 100 positively identifies the man 930 and minutes later the vehicle 920 and/or 910 also detect the man 930 at the same intersection, then the visual query would be terminated for the man 930. It should be appreciated that knowledge of the detections may be conveyed through the query system 300 or through direct communication channels between the vehicles 100, 910, and 920 (e.g., V2V comm.). In either case, the system 170 functions to, in one embodiment, limit the ongoing analysis of visual data according to the termination parameters in order to conserve resources (e.g., data bandwidth, computational resources, etc.). Of course in further aspects, instead of terminating the visual query upon satisfaction of the termination parameters, the system 170 may instead execute the visual query secondarily to other processes or queries that are executing or waiting to be executed by the system 170.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vision system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vision system 170, and/or the autonomous driving module(s) 160 may control some or all of these vehicle systems 140 and, thus, may be partially or fully autonomous.

The processor(s) 110, the vision system 170, and/or the autonomous driving module(s) 160 can be operatively connected to communicate with the various vehicle systems 140 and/or individual components thereof. For example, returning to FIG. 1, the processor(s) 110, the vision system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vision system 170, and/or the autonomous driving module(s) 160 may control some or all of these vehicle systems 140.

The processor(s) 110, the vision system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vision system 170, and/or the autonomous driving module(s) 160 can control the direction and/or speed of the vehicle 100. The processor(s) 110, the vision system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vision system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the visual inventory 250 as implemented by the search module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vision system for improving querying of visual data by using edge computing resources of collection devices in a distributed network, comprising:
    one or more processors;
    a memory communicably coupled to the one or more processors and storing:
        an acquisition module including instructions that when executed by the one or more processors cause the one or more processors to provide electronic inputs specifying visual content to be queried to cause a remote device to: generate a visual query including at least training a machine vision model using training data embodied in the electronic inputs by a cloud-based system associated with the remote device, identify available vehicles that correspond with a targeted location for a time window, and communicate the visual query to a sample of the available vehicles, and
        in response to receiving, from the remote device, the visual query in a selected vehicle that is equipped with at least one camera, identify search parameters from the query that specify at least visual content that is to be identified; and
        a search module including instructions that when executed by the one or more processors cause the one or more processors to analyze a subset of a visual inventory to identify whether the subset includes the visual content by using at least a machine vision model executing on a processor within the selected vehicle, wherein the visual inventory includes camera data that is previously acquired by the selected vehicle from the at least one camera, wherein the search module includes instructions to analyze the visual inventory including instructions to apply the machine vision model to the visual inventory to perform semantic segmentation that generates semantic labels for objects in the visual inventory,
        wherein the search module further includes instructions to communicate detection results about whether the subset includes the visual content to the remote device, and
        wherein the search module further includes instructions to communicate a location history of the selected vehicle to the remote device periodically, including the semantic labels identifying object classes of objects represented in the visual content to provide an index of content that is included within the visual content in combination with a history of content from additional devices at the remote device,
        wherein the search module includes instructions to communicate the location history to maintain the location history in a current state for accurate selection by the remote device of vehicles that are to be queried, and wherein the search module includes instructions to communicate including instructions to provide the semantic labels to the remote device for pre-filtering of vehicles that are to be selected for querying to avoid excessive use of bandwidth associated with communicating the visual content to the remote device while providing an efficient mechanism to select vehicles for querying.

2. The vision system of claim 1, wherein the search parameters specify the visual content by providing the machine vision model pre-trained to recognize the visual content and as part of the visual query, and wherein the machine vision model is a machine learning algorithm that identifies segments of the subset that include the visual content, and
    wherein the visual content includes one or more of a person of interest, a group of people, an animal of interest, a specific vehicle, environmental characteristics, and objects of interest.

3. The vision system of claim 1, wherein the acquisition module further includes instructions to load the subset of the visual inventory that correlates with a time window that is specified by the visual query into a memory for analysis by the machine vision model, and
    wherein the visual inventory includes previously recorded video acquired by the at least one camera and real-time video that the at least one camera is presently acquiring.

4. The vision system of claim 3, wherein the time window indicates a time associated with a location of the selected vehicle that is targeted for querying by the visual query, wherein the selected vehicle qualifies as one of the collection devices according to correlations between a location history of the selected vehicle and a targeted location associated with the visual query,
    wherein the visual query indicates a termination parameter for terminating analysis of real-time video within the visual inventory, and wherein the termination parameter indicates one or more of a frequency of detections for the visual content, a time limit, a data quota, and a stop request.

5. The vision system of claim 1, wherein the acquisition module further includes instructions to:
    acquire video data as a video stream from the at least one camera about a surrounding environment of the selected vehicle;
    analyze the video data according to an object recognition model to generate labels for classes of objects represented in the video data; and
    store the video data including the labels as the visual inventory in a data store of the vehicle.

6. The vision system of claim 5, wherein the acquisition module further includes instructions to, in response to a positive identification of the visual content existing in the subset by the machine vision model, collecting, in real-time by the at least one camera, additional visual data about a subject of the visual content, and
> wherein the acquisition module further includes instructions to collect the additional visual data further includes broadcasting the positive identification to nearby vehicles that are proximate to the selected vehicle to cause the nearby vehicles to collect visual data about the subject.

7. The vision system of claim 5, wherein the acquisition module further includes instructions to maintain the location history in a current state for accurate selection by the remote device of vehicles that are to be queried by the visual query, wherein the acquisition module further including instructions to provide the labels to the remote device for pre-filtering of vehicles that are to be selected for querying, and
> wherein the visual query further includes query parameters for pre-filtering the subset, the query parameters indicating at least object classes for the objects associated with the visual content.

8. A non-transitory computer-readable medium for improving the querying of visual data by using edge computing resources of collection devices in a distributed network and including instructions that when executed by one or more processors cause the one or more processors to:
> provide electronic inputs specifying visual content to be queried to cause a remote device to: generate a visual query including at least training a machine vision model using training data embodied in the electronic inputs by a cloud-based system associated with the remote device, identify available vehicles that correspond with a targeted location for a time window, and communicate the visual query to a sample of the available vehicles;
> in response to receiving, from the remote device, the visual query in a selected vehicle that is equipped with at least one camera, identify search parameters from the visual query that specify at least visual content that is to be identified,
> analyze a subset of a visual inventory to identify whether the subset includes the visual content by using at least a machine vision model executing on a processor within the selected vehicle, wherein the visual inventory includes camera data that is previously acquired by the selected vehicle from the at least one camera, wherein the instructions to analyze the visual inventory include instructions to apply the machine vision model to the visual inventory to perform semantic segmentation that generates semantic labels for objects in the visual inventory,
> communicate detection results about whether the subset includes the visual content to the remote device, and
> communicate a location history of the selected vehicle to the remote device periodically, including the semantic labels identifying object classes of objects represented in the visual content to provide an index of content that is included within the visual content in combination with a history of content from additional devices at the remote device,
> wherein the instructions to communicate the location history maintain the location history in a current state for accurate selection by the remote device of vehicles that are to be queried, and wherein the instructions to communicate further include instructions to provide the semantic labels to the remote device for pre-filtering of vehicles that are to be selected for querying to avoid excessive use of bandwidth associated with communicating the visual content to the remote device while providing an efficient mechanism to select vehicles for querying.

9. The vision system of claim 6, wherein the search module further includes instructions to:
> analyze the additional visual data according to the machine vision model to further identify characteristics of the subject, and
> provide, to the remote device from the selected vehicle, a refinement to the detection results that includes at least the identified characteristics.

10. The non-transitory computer-readable medium of claim 8, wherein the search parameters specify the visual content by providing the machine vision model pre-trained to recognize the visual content and as part of the visual query, and wherein the machine vision model is a machine learning algorithm that identifies segments of the subset that include the visual content, and
> wherein the visual content includes one or more of a person of interest, a group of people, an animal of interest, a specific vehicle, environmental characteristics, and objects of interest.

11. The non-transitory computer-readable medium of claim 10, wherein the instructions further include instructions to, in response to a positive identification of the visual content existing in the subset by the machine vision model, collect, in real-time by the at least one camera, additional visual data about a subject of the visual content,
> wherein the instructions further include instructions to collect the additional visual data further includes broadcasting the positive identification to nearby vehicles that are proximate to the selected vehicle to cause the nearby vehicles to collect visual data about the subject, and
> wherein the instruction include instruction to generate labels with additional visual data that include at least semantic labels identifying object classes of objects represented in the visual content.

12. The non-transitory computer-readable medium of claim 11, wherein the instructions further include instructions to load the subset of the visual inventory that correlates with a time window that is specified by the visual query into a memory for analysis by the machine vision model, and
> wherein the visual inventory includes previously recorded video acquired by the at least one camera and real-time video that the at least one camera is presently acquiring,
> wherein the time window indicates a time associated with a location of the selected vehicle that is targeted for querying by the visual query, and
> wherein the selected vehicle qualifies as one of the collection devices according to correlations between a location history of the selected vehicle and a targeted location associated with the visual query.

13. A method comprising:
> providing electronic inputs specifying visual content to be queried to cause a remote device to: generate a visual query including at least training a machine vision model using training data embodied in the electronic inputs by a cloud-based system associated with the remote device, identify available vehicles that correspond with a targeted location for a time window, and communicate the visual query to a sample of the available vehicles;

in response to receiving, in a selected vehicle that is equipped with at least one camera, the visual query from the remote device, identifying search parameters from the query that specify at least visual content that is to be identified;

analyzing a subset of a visual inventory to identify whether the subset includes the visual content by using at least the machine vision model executing on a processor within the selected vehicle, wherein the visual inventory includes camera data that is previously acquired by the selected vehicle from the at least one camera, and wherein analyzing the visual inventory includes applying the machine vision model to the visual inventory to perform semantic segmentation that generates semantic labels for objects in the visual inventory;

communicating detection results about whether the subset includes the visual content to the remote device; and communicating a location history of the selected vehicle to the remote device periodically, including the semantic labels identifying object classes of objects represented in the visual content to provide an index of content that is included within the visual content in combination with a history of content from additional devices at the remote device, wherein communicating the location history maintains the location history in a current state for accurate selection by the remote device of vehicles that are to be queried, wherein communicating further includes providing the semantic labels to the remote device for pre-filtering of vehicles that are to be selected for querying to avoid excessive use of bandwidth associated with communicating the visual content to the remote device while providing an efficient mechanism to select vehicles for querying.

14. The method of claim 13, wherein the search parameters specify the visual content by providing the machine vision model pre-trained to recognize the visual content and as part of the visual query, and wherein the machine vision model is a machine learning algorithm that identifies segments of the subset that include the visual content, and wherein the visual content includes one or more of a person of interest, a group of people, an animal of interest, a specific vehicle, environmental characteristics, and objects of interest.

15. The method of claim 13, further comprising:

loading the subset of the visual inventory that correlates with a time window that is specified by the visual query into a memory for analysis by the machine vision model, wherein the visual inventory includes previously recorded video acquired by the at least one camera and real-time video that the at least one camera is presently acquiring, wherein the time window indicates a time associated with a location of the selected vehicle that is targeted for querying by the visual query, and wherein the selected vehicle qualifies as one of a collection device according to correlations between the location history of the selected vehicle and a targeted location associated with the visual query.

16. The method of claim 13, further comprising:

acquiring video data as a video stream from the at least one camera about a surrounding environment of the vehicle;

analyzing the video data according to an object recognition model to generate labels for classes of objects represented in the video data; and storing the video data including the labels as the visual inventory in a data store of the vehicle.

17. The method of claim 16, wherein the visual query further includes query parameters for pre-filtering the subset, the query parameters indicating at least object classes for the objects associated with the visual content.

18. The method of claim 13, further comprising:

in response to a positive identification of the visual content existing in the subset by the machine vision model, collecting, in real-time by the at least one camera, additional visual data about a subject of the visual content, wherein collecting the additional visual data further includes broadcasting the positive identification to nearby vehicles that are proximate to the selected vehicle to cause the nearby vehicles to collect the additional visual data about the subject;

analyzing the additional visual data according to the machine vision model to further identify characteristics of the subject; and providing, to the remote device from the selected vehicle, a refinement to the detection results that includes at least the identified characteristics.

19. The method of claim 13, further comprising:

terminating ongoing analysis of real-time video in the visual inventory responsive to determining that a termination parameter of the visual query has been satisfied, wherein the termination parameter indicates one or more of a frequency of detections for the visual content, a time limit, a data quota, and a stop request.

* * * * *